(12) United States Patent
Grassold et al.

(10) Patent No.: US 11,199,234 B2
(45) Date of Patent: Dec. 14, 2021

(54) SPRING ASSEMBLY HAVING A COIL SPRING AND AN ANTI-ENTANGLEMENT ELEMENT

(71) Applicant: Scherdel Innotec Forschungs-und Entwicklungs-GmbH, Marktredwitz (DE)

(72) Inventors: Achim Grassold, Konnersreuth (DE); Patrick Foucart, Rebreuve Ranchicout (FR)

(73) Assignee: SCHERDEL INNOTEC FORSCHUNGS- UND ENTWICKLUNGS GMBH, Marktredwitz (DE)

( * ) Notice: Subject to any disclaimer, the term of this patent is extended or adjusted under 35 U.S.C. 154(b) by 44 days.

(21) Appl. No.: 16/489,558

(22) PCT Filed: Feb. 28, 2018

(86) PCT No.: PCT/EP2018/054895
§ 371 (c)(1),
(2) Date: Aug. 28, 2019

(87) PCT Pub. No.: WO2018/158296
PCT Pub. Date: Sep. 7, 2018

(65) Prior Publication Data
US 2019/0383343 A1 Dec. 19, 2019

(30) Foreign Application Priority Data
Feb. 28, 2017 (DE) .......................... 102017104111.7

(51) Int. Cl.
*F16F 1/12* (2006.01)
*B65D 85/08* (2006.01)
(Continued)

(52) U.S. Cl.
CPC .............. *F16F 1/128* (2013.01); *B65D 57/00* (2013.01); *B65D 85/08* (2013.01); *B65D 25/106* (2013.01)

(58) Field of Classification Search
CPC ............................... F16F 1/128; B65D 25/106
(Continued)

(56) References Cited

U.S. PATENT DOCUMENTS 2,308,713 A * 1/1943 Price ...................... B65D 85/08
206/493
3,053,384 A * 9/1962 Loomis .................. B24D 13/08
206/372

(Continued)

FOREIGN PATENT DOCUMENTS

DE 2109958 9/1972
DE 7340029 5/1975
(Continued)

*Primary Examiner* — Thomas J Williams
(74) *Attorney, Agent, or Firm* — Getz Balich LLC

(57) ABSTRACT

The present invention relates to a spring assembly, including: a coil spring having an inner space formed by the spring windings thereof; and an anti-entanglement element for protection against entanglement of the spring assembly, in particular with at least one further spring assembly or with at least one other coil spring; wherein the anti-entanglement element is partially disposed in the inner space formed by the spring windings and extends longitudinally through at least a portion of the inner space; and wherein the anti-entanglement element (14, 26) is provided in the form of an anti-entanglement stirrup, formed separately from the coil spring and clampingly supported in the inner space; or wherein the anti-entanglement element is provided in the form of an anti-entanglement pin, which is formed separately from the coil spring and has a front loss-prevention or captive end and a rear stop end.

12 Claims, 9 Drawing Sheets

(51) Int. Cl.
*B65D 25/10* (2006.01)
*B65D 57/00* (2006.01)

(58) Field of Classification Search
USPC .......................................................... 267/167
See application file for complete search history.

(56) References Cited

U.S. PATENT DOCUMENTS

| | | | | |
|---|---|---|---|---|
| 3,529,716 A * | 9/1970 | O'Connell | ............. | B65D 85/08 |
| | | | | 206/303 |
| 4,396,120 A * | 8/1983 | Morita | ............... | B65D 73/0014 |
| | | | | 206/443 |
| 2004/0222578 A1* | 11/2004 | Bourgois | ................ | F16F 1/128 |
| | | | | 267/169 |
| 2008/0116623 A1* | 5/2008 | Crocker | ................. | F16F 1/128 |
| | | | | 267/169 |
| 2015/0158479 A1 | 6/2015 | Maki | | |

FOREIGN PATENT DOCUMENTS

| | | | | |
|---|---|---|---|---|
| DE | 2740257 A1 * | 3/1979 | ............. | B65D 85/08 |
| DE | 2804212 A1 * | 8/1979 | ............. | B65D 85/08 |
| DE | 3809494 A1 | 12/1988 | | |
| EP | 0216476 | 1/1987 | | |
| EP | 1612449 | 3/2009 | | |
| EP | 2826734 | 1/2015 | | |
| FR | 15245 | 5/1912 | | |
| WO | 9006453 | 6/1990 | | |

\* cited by examiner

SPRING ASSEMBLY HAVING A COIL SPRING AND AN ANTI-ENTANGLEMENT ELEMENT

This application is entitled to the benefit of, and incorporates by reference essential subject matter disclosed in PCT Application No. PCT/EP2018/054895 filed on Feb. 28, 2018, which claims priority to German Application No. 10 2017 104 111.7 filed Feb. 28, 2017.

BACKGROUND OF THE INVENTION

1. Technical Field

The present invention relates to a spring assembly comprising a coil spring and an anti-entanglement element extending within the windings of the coil spring. The invention relates furthermore to methods for introducing an anti-entanglement element into an inner space of a coil spring and methods for removing the anti-entanglement element from the inner space of the coil spring.

2. Background Information

In the manufacture of coil springs, there is often dispensed a plurality of coil springs into a common receptacle, and in this receptacle the coil springs are transported to their destination. This often leads to the problem that coil springs get entangled and can be separated from each other at the destination with difficulty only. Sometimes a damage-free separation of mutually entangled coil springs is not possible at all.

It is known from DE 38 09 494 A1 in the manufacture of coil springs to loosely string the same on a wire and to store the same in a container as a "spring chain". During further processing, one end of this spring chain is inserted into a separating or singling device, which removes the central wire and outputs the springs individually. Stringing several coil springs on a wire during manufacture is laborious and only rarely practiced.

It is therefore an object of the present invention to reliably prevent entanglement of coil springs. For this purpose, a suitable spring assembly and corresponding methods permitting simple and reliable implementation thereof are to be provided.

SUMMARY OF THE INVENTION

This object is met by the subject matter of the independent claims. Advantageous developments are indicated in the dependent claims.

A spring assembly according to the invention comprises: a coil spring having an inner space formed by the spring windings thereof; and an anti-entanglement element for protection against entanglement of the spring assembly, in particular with at least one further spring assembly or with at least one other coil spring; wherein the anti-entanglement element is partially disposed in the inner space formed by the spring windings and extends longitudinally through at least a portion of the inner space; and wherein the anti-entanglement element is provided in the form of an anti-entanglement stirrup, in particular an anti-entanglement wire stirrup, formed separately from the coil spring and clampingly supported in the inner space; or wherein the anti-entanglement element is provided in the form of an anti-entanglement pin, in particular an anti-entanglement plastic pin, which is formed separately from the coil spring and has a front loss-prevention or captive end and a rear stop end.

A plurality of coil springs, each provided with the anti-entanglement element according to the invention, can be transported in a common container without getting entangled. The anti-entanglement element prevents entering of the windings of adjacent coil springs into the inner space of adjacent coil springs. The windings of adjacent coil springs abut the anti-entanglement element extending through the inner space of the coil spring. This effectively avoids that the windings of coil springs are brought into engagement with each other, thus causing coil springs to get entangled with each other.

Thus, it is possible during manufacture to dispense a plurality of spring assemblies according to the invention together into a container and to transport the same in this container to their destination, without these spring assemblies getting entangled with each other.

It is advantageous when the anti-entanglement elements according to the invention are introduced into the respective inner space formed by the spring windings immediately during the manufacture of the coil springs, still before the spring assemblies can get into the common container.

Due to the fact that the anti-entanglement elements are formed separately from the respective coil springs, there is no mechanical separation necessary, which is required for a conceivable one-piece design of anti-entanglement elements. Sharp ends and the chip, which could be the result of such a mechanical separation, can be reliably avoided.

Both in the design of the anti-entanglement element as anti-entanglement stirrup and in the design of the anti-entanglement element as anti-entanglement pin, said stirrup/pin is reliably arranged in clamping and/or captive manner with respect to the coil spring and can be introduced into the coil spring and released from the same in automated manner.

Furthermore, the anti-entanglement elements according to the invention can be reused almost as often as desired.

Spring assemblies according to the invention are very well suited for the production of large numbers of coil springs and for automatic handling both on the spring production side and on the customer side, i.e. when the coil springs are brought into their intended use position.

Furthermore, spring assemblies according to the invention are suitable as bulk material and for an automated process flow.

The anti-entanglement stirrup solution, in which the anti-entanglement stirrup is made of a metal, has the further advantage that it can remain in the coil spring also during heat treatment operations.

In the anti-entanglement stirrup solution, the anti-entanglement stirrup may be made of a wire material of any cross-section, in particular a round, oval, or multi-arc cross-section. Similarly, the anti-entanglement stirrup can also be made of a strip material.

The anti-entanglement elements, i.e. both the anti-entanglement stirrups and the anti-entanglement pins, can remain in the coil springs also in cleaning processes during manufacture.

In particular in the anti-entanglement pin solution, the spring can be arranged on the anti-entanglement pin in axially biased manner, in particular between the front captive end and the rear stop end.

According to a first embodiment, the anti-entanglement stirrup has at least two stirrup legs and a stirrup bow or junction which integrally connects the at least two stirrup legs.

Such an anti-entanglement stirrup is of simple construction and easy and inexpensive to produce. At the same time it can be easily introduced into the inner space of a coil spring and thus prevents entanglement of the coil spring with other coil springs or spring assemblies in particularly effective manner. Likewise, the anti-entanglement stirrup can be easily removed from the inner space of the coil spring, so that the coil spring can be brought into its actual destination position.

The stirrup legs may also each have a nose or bulge facing away from each other, for improved grip of the stirrup legs on the coil spring, e.g. by engagement of the nose or bulge between windings of the coil spring.

At least one of the stirrup legs of the anti-entanglement stirrup may be formed with at least one nose, with at least one bead and/or with at least one step. This provides for enhanced and slip-resistant and/or captive positioning of the anti-entanglement stirrup with respect to the coil spring. At the same time, deformation of the windings of the coil spring is prevented. Finally, in such a design of the stirrup legs, there is provided an advantageous withdrawal force while there is achieved at the same time a simple construction of the anti-entanglement stirrup. The at least one nose, bead or step can be arranged in particular in the space between two adjacent spring windings, resulting in an even better and more slip-resistant positioning of anti-entanglement stirrup with respect to the coil spring.

Furthermore, when the anti-entanglement stirrup has in particular outwardly directed stirrup ends, with respect to the axis of symmetry of the anti-entanglement stirrup, over-insertion of the anti-entanglement stirrup into the inner space of the spring can be prevented in simple manner. Furthermore, such stirrup ends facilitate automated insertion and removal of the anti-entanglement stirrup. Moreover, they form a stop and thus determine the maximum insertion depth of anti-entanglement stirrup into the inner space of the coil spring.

The stirrup ends can serve, for example, as gripping location for compressing the stirrup legs. For such compressing, there may be used clamping jaws, which may have for example recesses for receiving the stirrup ends in slip-proof manner.

According to a further embodiment, the anti-entanglement stirrup furthermore may have eyelet-shaped, in particular eyelet-shaped curved stirrup ends. This avoids entanglement of such an anti-entanglement stirrup and a spring assembly having such an anti-entanglement stirrup with respect to other anti-entanglement stirrups, spring assemblies and coil springs. In addition, the risk is reduced that material used for transport of such spring assemblies, e.g. transport bags, is damaged, in particular pierced, by projecting, possibly pointed spring wire ends of the anti-entanglement stirrups. Likewise, abrasion in transport bags is prevented, and thus the formation of particles during transport is minimized.

According to a further embodiment, the anti-entanglement stirrup is clampingly supported in the inner space of the coil spring formed by the spring windings such that the axis of symmetry of the coil spring and the axis of symmetry of anti-entanglement stirrup constitute a common axis.

As a result, the anti-entanglement stirrup is centered in the coil spring, which contributes to a particularly good clamping force distribution and thus both to simple introduction and simple release of anti-entanglement stirrup.

According to a further embodiment, the anti-entanglement stirrup is clampingly supported in the inner space of the coil spring formed by the spring windings such that the at least two stirrup legs abut a plurality of the inner sides of spring windings and that an outwardly directed clamping force acts on the inner sides of the spring windings.

Due to the fact that the clamping force acts on a plurality of spring windings, there is created in turn a particularly homogeneous clamping force distribution, which in turn contributes to both simple insertion and simple release of the anti-entanglement stirrup.

According to a further embodiment, the anti-entanglement stirrup is clampingly supported in the inner space of the coil spring formed by the spring windings such that the stirrup ends, with respect to the axis of symmetry of the coil spring, protrude at an axial end of the coil spring in radial outward direction.

As a result, the spring ends can be readily grasped and compressed for introduction and release of the anti-entanglement stirrup into and from the inner space of the coil spring. At the same time, they thus form a stop for the coil spring and define the maximum insertion depth.

According to a further embodiment, the anti-entanglement stirrup has two stirrup legs with a respective stirrup end and a stirrup junction which integrally connects the two stirrup legs. The anti-entanglement stirrup is designed in particular such that the stirrup junction biases the two stirrup legs, in the position not introduced into the inner space formed by the spring windings, outwardly to such an extent that the distance between the portions of the stirrup ends adjoining the outwardly projecting stirrup ends is greater than the inner diameter of the coil spring; and/or that, by a compressive force acting on the outwardly projecting stirrup ends in the radial direction for introducing the anti-entanglement stirrup into the inner space and for removing the anti-entanglement stirrup from the inner space, the two stirrup legs can be compressed in the radial direction to such an extent that the distance between the portions of the stirrup legs adjoining the outwardly projecting stirrup ends is smaller than the inner diameter of the coil spring.

Such an anti-entanglement stirrup with two stirrup legs very reliably prevents entanglement of the spring assembly with other coil springs or spring assemblies. For insertion of the anti-entanglement stirrup, the stirrup legs are compressed by a compressive force acting on the stirrup ends in the radial direction, which can be implemented easily and in automated manner.

According to a further embodiment, the anti-entanglement stirrup has three stirrup legs with a respective stirrup end and a stirrup junction which integrally connects the three stirrup legs to each other, said stirrup legs being staggered in particular at an angle of approximately 120° to each other in the circumferential direction. In this case, the anti-entanglement stirrup is designed in particular such that the stirrup junction biases the three stirrup legs, in the position not introduced into the inner space formed by the spring windings, outwardly to such an extent that the corners of the triangle formed by the portions of the stirrup legs adjoining the outwardly projecting stirrup ends and located in a plane perpendicular to the axis of symmetry of the anti-entanglement stirrup, lie on a circle whose diameter is greater than the inner diameter of the coil spring; and/or that, by way of a compressive force acting in the radial direction on the outwardly projecting stirrup ends for introducing the anti-entanglement stirrup into the inner space and for removing the anti-entanglement stirrup from the inner space, the three stirrup legs are compressible in the radial direction to such an extent that the corners of the triangle formed by the portions of the stirrup legs adjoining the outwardly projecting stirrup ends which lie in a plane perpendicular to the axis of symmetry of the anti-entanglement stirrup, lie on a circle whose diameter is smaller than the inner diameter of the coil spring.

Such an anti-entanglement stirrup with three stirrup legs is particularly effective for preventing entanglement of the spring assembly according to the invention with other coil springs and spring assemblies. For introduction of the anti-entanglement stirrup into the inner space of the coil spring, the three stirrup legs are pressed from the outside radially inwardly in such a manner that the triangle formed by the portions of the stirrup legs adjoining the stirrup ends is reduced in size such that it virtually fits into the inner space of the coil spring. This too can be readily implemented in automated manner.

According to a further embodiment, the anti-entanglement stirrup extends so far into the inner space of the coil spring formed by the spring windings that the outwardly projecting stirrup ends rest against or abut the first windings of the coil spring, and/or that the stirrup junction is arranged radially inside the last winding or one of the last windings of the coil spring.

Thus, the anti-entanglement stirrup extends virtually along the entire axial extension of the spring assembly within the inner space of the coil spring and thus prevents unwanted entanglement with other coil springs and spring assemblies very effectively and across the entire axial length.

For the anti-entanglement function, the stirrup ends do not necessarily have to abut the first winding. The wire stirrup is held in the axial direction by the bias against the inside of the spring windings.

According to a further embodiment, the stirrup junction is arranged inside the winding body. In an alternative embodiment, the stirrup junction can also protrude a certain distance beyond the end of the winding body or protrude from the same.

According to a further embodiment, the anti-entanglement stirrup may also have inwardly formed stirrup ends, stirrup ends integrally formed in the circumferential direction of the spring or stirrup ends without any curvature.

According to a further embodiment, the anti-entanglement pin comprises a pin body whose diameter is smaller than the inner diameter of the coil spring and which has a longitudinal opening extending in the axial direction through the pin body. Such a pin body fills a large part of the inner space of the coil spring and thus reliably prevents entanglement of the spring assembly with other coil springs and other spring assemblies.

According to a further embodiment, the pin body is tubular. With a tubular design of the pin body, an actuating pin can be passed through the pin body, by means of which the loss-prevention or captive end described in detail in the following can be actuated.

According to a further embodiment, the front captive end is formed so as to permit actuation thereof through the longitudinal opening of the pin body.

According to a further embodiment, the rear stop end is designed as a broadened insertion-depth limiting collar formed integrally with the pin body and having a diameter which is greater than the inner diameter of the coil spring.

Due to the broadened insertion-depth limiting collar, it is thus possible to reliably prevent too deep insertion of the anti-entanglement pin into the inner space of the coil spring. The insertion-depth limiting collar defines the maximum insertion position of the anti-entanglement pin by abutment on the rearmost spring winding.

According to a further embodiment, the diameter of the front captive end in the unactuated state is greater than the inner diameter of the coil spring.

According to a further embodiment, the diameter of the front captive end is variable, in particular by actuation with an actuating pin which is inserted through the longitudinal opening of the pin body.

According to a further embodiment, the front captive end can be actuated by an actuating pin inserted through the longitudinal opening of the pin body or by an actuating tube inserted through the longitudinal opening of the pin body, such that the diameter of the front captive end decreases such that it is smaller than that inner diameter of the coil spring.

It is thus possible to bring the front captive end, by actuation with the actuating pin, into an inserted position in which the diameter of the front captive end is smaller than the inner diameter of the coil spring. In the unactuated state of the front captive end, the latter has a greater diameter than the inner diameter of the coil spring, and accordingly the anti-entanglement pin is supported by means of the front captive end and by means of the rear insertion-depth limiting collar with respect to the coil spring in reliable and loss-preventing manner.

According to a further embodiment, the front captive end has at least two loss-prevention arms which are arranged beginning at the front end of the pin body and in particular are formed integrally therewith.

According to a further embodiment, the at least two loss-prevention arms each have at least one radially outwardly curved bulge portion and a front forceps end, and/or the at least two loss-prevention arms are designed to be bendable, in particular bendable such that, in case of an axially forwardly directed actuation of the front forceps ends of the loss-prevention arms by way of an actuating pin introduced through the longitudinal opening of the pin body, the bulge portions of the loss-prevention arms are stretched, thereby reducing the diameter of the bulge portions; in doing so, the diameter of the bulge portions decreases from a larger diameter which is greater than the inner diameter of the coil spring to a smaller diameter which is smaller than the inner diameter of the coil spring.

This constitutes an embodiment that is easy to implement and manufacture, reliably supports the anti-entanglement pin with respect to the coil spring and at the same time permits easy introduction of the anti-entanglement pin into the coil spring and removal from the same.

According to another embodiment, the pin body of the anti-entanglement pin is disposed in the inner space formed by the spring windings, the rear stop end abuts the rearmost winding of the coil spring and the front captive end, in particular the bulge portions of the loss-prevention arms, is/are arranged in front of the foremost winding of the coil spring. The bulge portions of the loss-prevention arms can assume a diameter which is greater than the inner diameter of the coil spring.

In this embodiment, the anti-entanglement pin is easily and reliably supported with respect to the coil spring.

According to a further embodiment, a plurality of springs are arranged in succession on one anti-entanglement element or one anti-entanglement element extends through two or more springs.

An inventive method for introducing an anti-entanglement stirrup into an inner space of a coil spring, in particular for forming a spring assembly, comprises the following steps: providing a coil spring having an inner space formed by the spring windings thereof; providing an anti-entanglement stirrup having at least two stirrup legs, a stirrup junction integrally connecting the at least two stirrup legs to each other, and outwardly directed stirrup ends arranged beginning at the ends of the stirrup legs; compressing the stirrup ends in the radial direction by a compressive force acting on the stirrup ends in the radial direction, to such an extent that the distance between the portions of the stirrup legs adjoining the outwardly projecting stirrup ends is less than or equal to the inner diameter of the coil spring; inserting the anti-entanglement stirrup into the inner space of the coil spring, in particular to such an extent that the outwardly projecting stirrup ends abut the first winding of the coil spring and/or such that the stirrup junction is disposed radially within the last winding or one of the last windings of the coil spring; and terminating the compression of the stirrup ends.

With such a method according to the invention, an anti-entanglement stirrup can be introduced easily, and in particular in automated manner, into the inner space of a coil spring and can be held there reliably in clamping manner.

If necessary, the anti-entanglement stirrup and the coil spring need to be brought before into a defined position relative to each other for automated introduction.

The anti-entanglement stirrup can also be inserted into the coil spring axially on a mandrel, and the stirrup legs during the entire insertion operation can slide in biased manner along the inside of the spring windings.

For the anti-entanglement function, the stirrup ends do not necessarily have to abut on the first winding. The wire stirrup is held in the axial direction by the bias against the inside of the spring windings.

It is sufficient when the anti-entanglement stirrup is introduced into the inner space of the coil spring to such an extent that the stirrup junction is located within the winding body. In an alternative embodiment, the anti-entanglement stirrup can be introduced into the inner space of the coil spring to such an extent that the stirrup junction protrudes a certain distance beyond the end of the winding body or protrudes outwardly from the same.

An inventive method for removing the anti-entanglement stirrup from the inner space of a coil spring in a spring assembly comprises the following steps: providing a spring assembly; compressing the stirrup ends in the radial direction by a compressive force acting on the stirrup ends in the radial direction, to such an extent that the distance between the portions of the stirrup legs adjoining the outwardly projecting stirrup ends is smaller than the inner diameter of the coil spring; removing the anti-entanglement stirrup from the inner space of the coil spring, in particular by dropping the coil spring due to its gravity; and terminating the compression of the stirrup ends.

With such a method according to the invention, the anti-entanglement stirrup can be removed from the inner space of a coil spring quickly and easily and in particular in automated manner.

During final assembly at the customer's site, the coil spring, in particular rotated by 180°, can drop by gravity from the compressed anti-entanglement stirrup into the final device.

If necessary, spring assemblies need to be singulated for this purpose and brought into a specific orientation, in which, for example, the stirrup ends are aligned towards the clamping jaws.

An inventive method for introducing an anti-entanglement pin into an inner space of a coil spring, in particular for forming a spring assembly, comprises the following steps: providing a coil spring having an inner space formed by the spring windings thereof; providing an anti-entanglement pin having a pin body whose diameter is smaller than the inner diameter of the coil spring and which has a longitudinal opening extending axially through the pin body, having a front loss-prevention or captive end which is adapted to be actuated through the longitudinal opening of the pin body, and having a rear stop end formed as a broadened insertion-depth limiting collar formed integrally with the pin body and having a diameter which is larger than the inner diameter of the coil spring; actuating the front captive end by inserting an actuating pin through the longitudinal opening of the pin body such that the diameter of the front captive end decreases such that it is smaller than the inner diameter of the coil spring; inserting the anti-entanglement pin into the inner space of the coil spring or dropping the coil spring onto the anti-entanglement pin, in particular so far that the broadened insertion-depth limiting collar abuts the rearmost winding of the coil spring and/or the front captive end is arranged in front of the foremost winding of the coil spring; and terminating the actuation of the front captive end by pulling the actuating pin out of the longitudinal opening of the pin body.

With such a method according to the invention, an anti-entanglement pin can be introduced into the inner space of a coil spring easily and in particular in automated manner and can be reliably held there.

It may be necessary for automated introduction to bring the anti-entanglement pin and the coil spring into a defined position or aligned position relative to each other beforehand.

Particularly good automation is permitted by a method and a corresponding device for introducing an anti-entanglement pin into the inner space of a coil spring, in which the coil spring is dropped by gravity from a supply vertically onto the opened anti-entanglement pin.

A method for removing the anti-entanglement pin from the inner space of a coil spring in a spring assembly, according to the invention, comprises the following steps: providing a spring assembly; actuating the front captive end by inserting an actuating pin through the longitudinal opening of the pin body such that the diameter of the front captive end decreases such that it is smaller than the inner diameter of the coil spring; and withdrawing the anti-entanglement pin from the inner space of the coil spring.

With such a method according to the invention, the anti-entanglement pin can be removed from the inner space of a coil spring quickly and easily and in particular in automated manner.

During final assembly at the customer's site, the coil spring, in particular rotated by 180°, can drop by gravity from the opened anti-entanglement pin into the final device.

It may be necessary for this purpose that spring assemblies are singulated and brought into a specific orientation, in which, for example, the insertion-depth limiting collar is aligned in the withdrawal direction of the actuating pin.

The advantages and embodiments indicated hereinbefore with reference to the spring assembly also apply in procedural correspondence to the methods of claims 12 to 15. These advantages and embodiments are not indicated again to avoid repetitions.

BRIEF DESCRIPTION OF THE DRAWINGS

The invention will be explained in more detail below by way of embodiments with reference to the accompanying drawings.

DETAILED DESCRIPTION OF THE INVENTION

Figure 1:
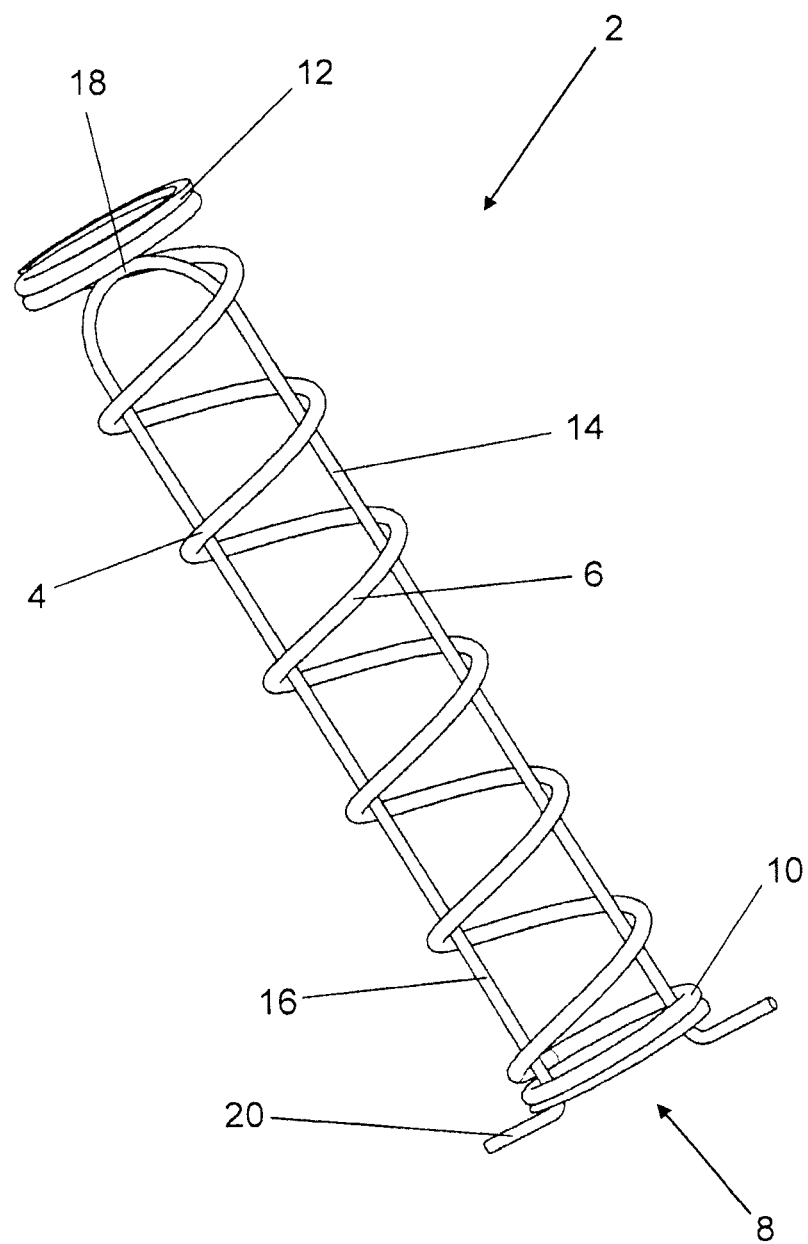
FIG. 1 illustrates a first spring assembly according to a first embodiment in a schematic perspective view.

In the figures, like reference numerals designate the same or functionally identical components, unless indicated otherwise.

FIG. 1 shows a first spring assembly 2 according to an embodiment in a schematic perspective view.

The first spring assembly 2 comprises a first coil spring 4 with an inner space 8 formed by its spring windings 6. The first coil spring 4 in the image shown extends obliquely from the upper left to the lower right. The spring windings 6 merge at one end of the first coil spring 4 into a lower end winding 10 and at the upper end into an upper end winding 12. There may also be provided a plurality of upper and lower end windings 10, 12, respectively, which then e.g. directly abut each other, thereby forming particularly stable end portions of the first coil spring 4 in which the windings 10, 12 abut each other. Between the end windings 10 and 12, the spring windings 6 have a greater pitch, and adjacent spring windings 6 do not abut each other but form a space therebetween. In the region of the end windings 10, 12, the pitch of the first coil spring 4 is very small, so that the lower end winding 10 and the upper end winding 12 each form an approximately annular end of the first coil spring 4.

Furthermore, the first spring assembly 2 comprises a first anti-entanglement stirrup 14 which acts as a anti-entanglement element. The first anti-entanglement stirrup 14 is formed as a wire stirrup separately from the coil spring 4 and has two stirrup legs 16 and a stirrup bow or junction 18 integrally connecting the two stirrup legs 16 to each other. In the drawing, the stirrup junction 18 can be seen on the upper left below the upper end winding 10. The stirrup legs 16 then extend from the stirrup junction 18 in the inner space 8 of the first coil spring 4 towards the lower right. In the area where the stirrup legs 16 exit from the inner space 8 of the first coil spring 4, the stirrup legs 16 are bent radially outwardly relative to the first coil spring 4, and extend outwardly of the inner space 8 of the first coil spring 4 as outwardly directed stirrup ends 20 with respect to the axis of symmetry of the first anti-entanglement stirrup 14. The stirrup ends 20 protrude from the longitudinal extension direction of each stirrup leg 16 holding them at a large angle, which in the present embodiment is about 90 degrees.

The first anti-entanglement stirrup 14 is clampingly supported or held in the inner space 8 of the first coil spring 4. For this purpose, the stirrup legs 16 abut a plurality of the inner sides of the windings 6 and exert an outwardly directed clamping force on the inner sides of the windings 6. The clamping force results from an elastic biasing by compression of the stirrup legs 16 when introducing them into the first coil spring 4.

The anti-entanglement stirrup 14 prevents penetration of the windings of adjacent coil springs into the inner space 8 of the first coil spring 4. The windings of adjacent coil springs abut the anti-entanglement element, which in the instant case is the anti-entanglement stirrup. This avoids that the windings of the coil springs come into engagement and interlock or get entangled with each other. This is particularly advantageous when a plurality of coil springs are arranged in a common container, as is the case for example in the manufacture of coil springs, when the coil springs manufactured immediately before are dispensed into a common container and when the coil springs are transported in a common container, for example, from the place of manufacture of the coil springs to the destination or installation location, where the coil springs are brought into their intended use position.

FIGS. 2A to 2D illustrate a method for introducing an anti-entanglement stirrup 14 into an inner space 8 of a coil spring 4, in particular for forming the first spring assembly 2, broken down into individual method steps. For the sake of simplicity, the first spring assembly 2 will be referred to as spring assembly 2 and the first coil spring 4 will be referred to as coil spring 4 in this method description.

The method comprises the following steps, which are designated as FIGS. 2A to 2D and are shown sequentially from top to bottom.

Figure 2A:
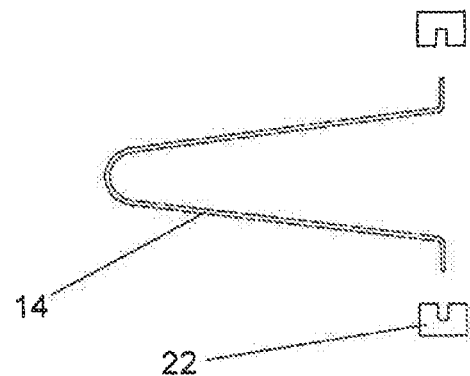
FIGS. 2A to 2D illustrate a method for introducing an anti-entanglement stirrup into an inner space of a coil spring for forming the first spring assembly, broken down into individual method steps.

FIG. 2A illustrates the method step of providing an anti-entanglement stirrup 14 having at least two stirrup legs 16, a stirrup junction 18 which integrally connects the at least two stirrup legs 16 to each other, and outwardly directed stirrup ends 20 beginning at the ends of the stirrup legs 16. The structure of the anti-entanglement stirrup 14 used here corresponds to that shown in FIG. 1, to which reference is made. Furthermore, clamping jaws 22 are shown in FIG. 2A, which are arranged radially outside the stirrup ends 22. The clamping jaws 22 are adapted to press the stirrup ends 20 and thus also the stirrup legs 16 together. In order to avoid slipping of the stirrup ends 20 at the clamping jaws 22, the stirrup ends 20 are introduced into recessed centering elements 23 in the clamping jaws 22.

Figure 2B:
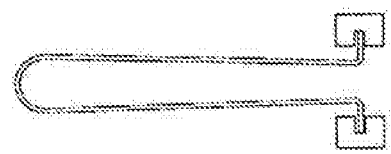

FIG. 2B illustrates the method step of compressing the stirrup ends 20 in the radial direction, by a compressive force acting on the stirrup ends 20 in the radial direction. The stirrup ends 20 are compressed by the clamping jaws 22 to such an extent that the distance between the portions of the stirrup legs 16 adjoining the outwardly projecting stirrup ends is smaller than the inner diameter of the coil spring 4.

Figure 2C:
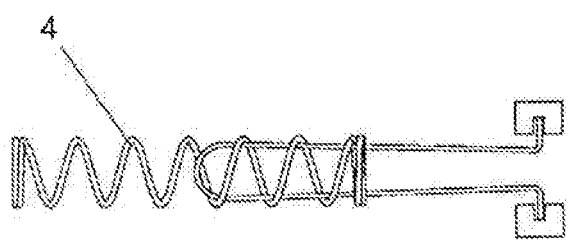

FIG. 2C illustrates the method step of inserting the anti-entanglement stirrup 14 into the inner space 8 of the coil spring 4, in particular to such an extent that the outwardly projecting stirrup ends 20 abut the first winding or lowermost winding 10 of the coil spring and/or that the stirrup junction 18 is disposed radially inside the last winding or upper end winding 12 or one of the last windings of the coil spring 4.

Alternatively, the anti-entanglement stirrup 14 can also be inserted into the inner space 8 of the coil spring 4, without the outwardly projecting stirrup ends 20 abutting the first winding or lowermost winding 10 of the coil spring.

As an alternative, the anti-entanglement stirrup 14 can also be inserted or pushed so far into the inner space 8 of the coil spring 4 that the stirrup junction 18 projects beyond the last winding or upper end winding 12.

Figure 2D:
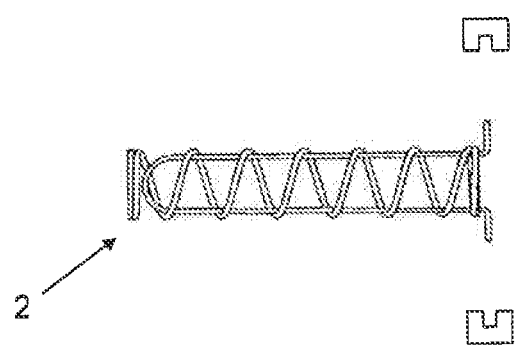

FIG. 2D illustrates the method step of terminating the compression of the stirrup ends 20. For this purpose, the clamping jaws 22 have been moved apart again. The spring assembly 2 may now be transported away or stored in a collecting container together with other spring assemblies in a manner preventing entanglement.

FIGS. 3A to 3D illustrate a method for removing an anti-entanglement stirrup 14 from the inner space of a coil spring 4 in a spring assembly according to the first embodiment, broken down into individual method steps. For the sake of simplicity, the first spring assembly 2 will be referred to as spring assembly 2 and the first coil spring 4 will be referred to as coil spring 4 in this method description.

Figure 3A:
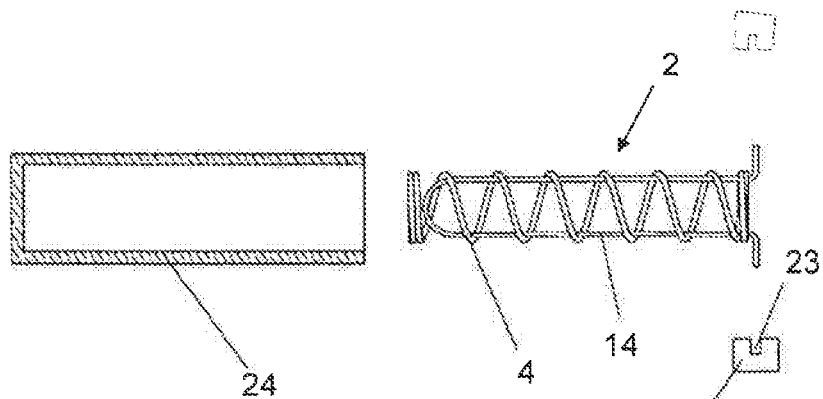
FIGS. 3A to 3D illustrate a method for removing an anti-entanglement stirrup from the inner space of a coil spring in a first spring assembly, broken down into individual method steps.

FIG. 3A illustrates the method step of providing a spring assembly according to any of claims 1 to 6. Furthermore, a component 24 for receiving the coil spring 4 is provided. The component 24 is designed in the form of a cylindrical sleeve with a bottom, the opening of which is directed towards the spring assembly 2 and the axis of symmetry of which is aligned with the axis of symmetry of the spring assembly 2.

Radially outside the stirrup ends 20, there are again arranged clamping jaws 22 which correspond to the clamping jaws 22 described in FIG. 2.

Figure 3B:
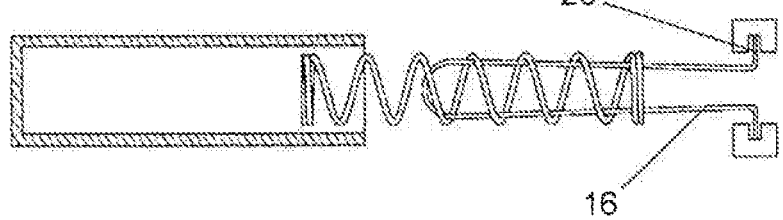

FIG. 3B illustrates the method step of compressing the stirrup ends 20 in the radial direction, by a compressive force acting on the stirrup ends 20 in the radial direction, to such an extent that the distance between the portions of the stirrup legs 16 adjoining the outwardly projecting stirrup ends 20 is smaller than the inner diameter of the coil spring. 4

The coil spring 4 can now be moved from the anti-entanglement stirrup 14 towards the left into the component 24. This can be effected by relative movement of the clamping jaws 22 towards the component 24. Alternatively, the clamping jaws 22 and the component 24 may remain in an unchanged relative position with respect to each other, and the movement of the coil spring 4 into the component 24 can be effected by a separate displacement element which, though not shown in FIG. 3B, is easily conceivable.

Figure 3C:
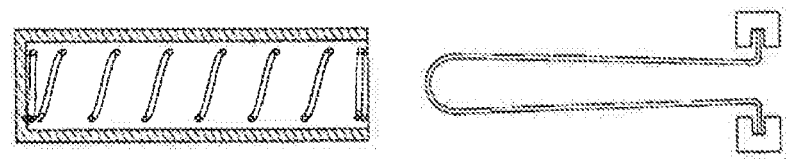

FIG. 3C illustrates the method step of removing the anti-entanglement stirrup 14 from the inner space 8 of the coil spring 4. The coil spring 4 and the anti-entanglement stirrup 14 are thereby guided apart in the axial direction and the coil spring 4 is deposited at the component 24.

Figure 3D:
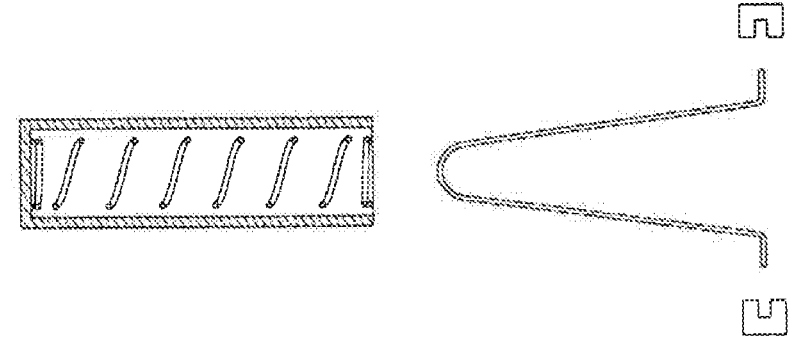

FIG. 3D illustrates the method step of terminating the compression of the stirrup ends 20.

Figure 4:
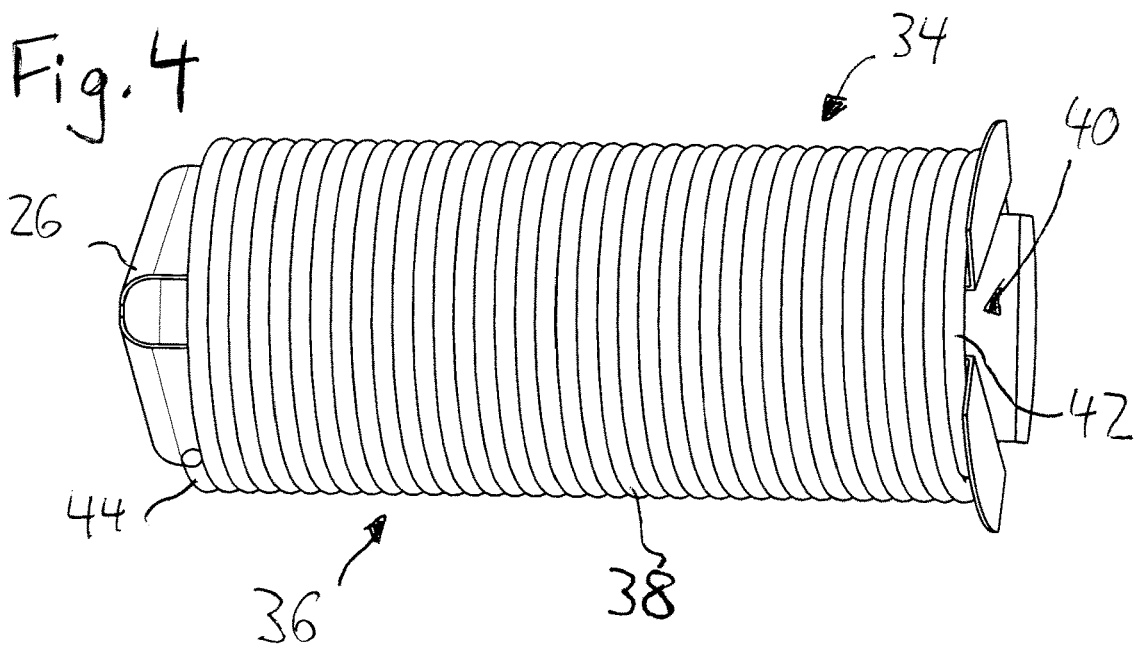
FIG. 4 illustrates a second spring assembly according to a second embodiment in a schematic perspective view.

FIG. 4 illustrates a second spring assembly 34 according to a second exemplary embodiment in a schematic perspective view.

The second spring assembly 34 comprises a second coil spring 36 having an inner space 40 formed by the spring windings 38 thereof. The second coil spring 36 in the figure extends from left to right. The windings 38 of the second coil spring 36 in the figure merge into a lower end winding 42 at the right end of the second coil spring 36 and into an upper end winding 44 at the upper end. The pitch of the second coil spring 36 is very small, so that said coil spring 36 is illustrated approximately as a cylindrical body. Although the windings of the second coil spring 36 are shown in FIG. 4 without spacing to each other, however, one can imagine that respective adjacent windings are spaced apart from each other as in case of the first coil spring 4.

Furthermore, the second spring assembly 34 comprises a second anti-entanglement stirrup 26, which acts as anti-entanglement element. In the second anti-entanglement stirrup 26, three stirrup legs 28 are connected to each other via a stirrup junction 30. The stirrup legs 28 extend from the stirrup junction 30 through the inner space 40 of the second coil spring 36 towards the right. In the area where the stirrup legs 28 exit from the inner space 40 of the second coil spring 36, the stirrup legs 28 are bent radially outward with respect to the second coil spring 36 and extend outside of the inner space 40 of the second coil spring 36 as outwardly directed stirrup ends 32 with respect to the axis of symmetry of the anti-entanglement stirrup 14.

Figure 5:
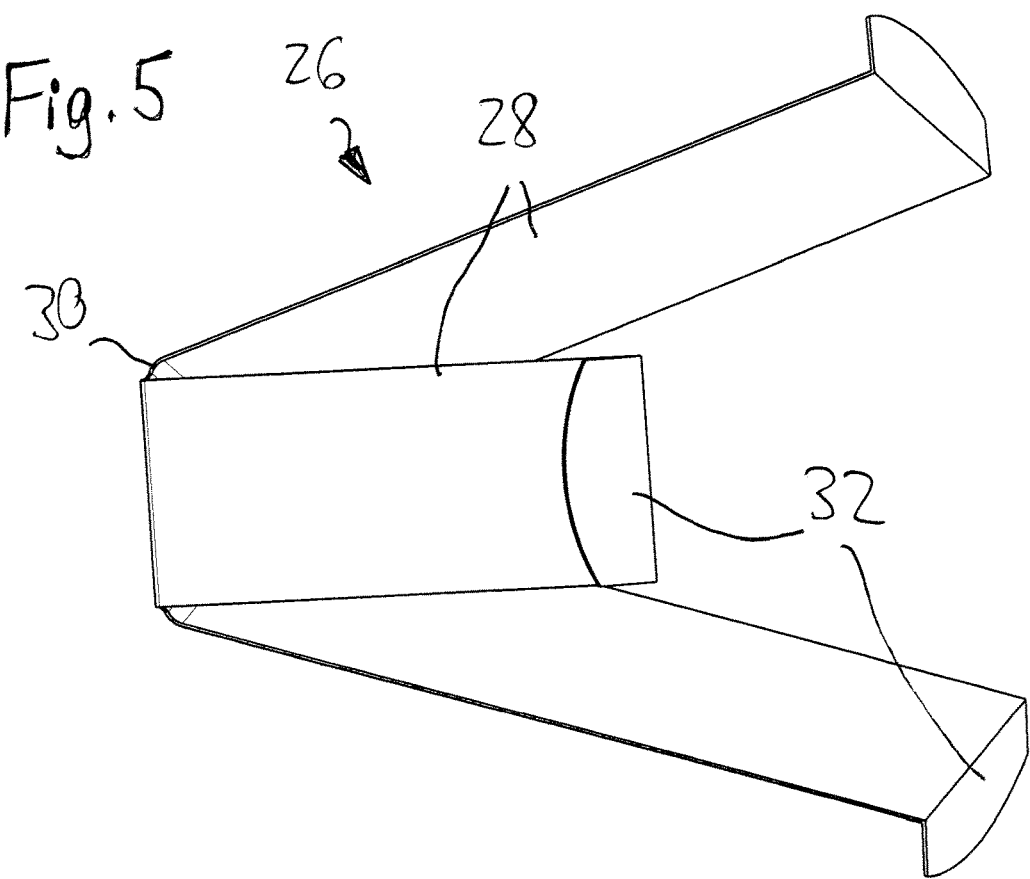
FIG. 5 illustrates the anti-entanglement stirrup of the second spring assembly in a schematic perspective view.

In FIG. 4, the anti-entanglement stirrups are introduced into the inner space 40 of the second coil spring 36 to such an extent that the outwardly projecting stirrup ends 32 abut the lower end winding 42. In this case, the stirrup legs 28 are resiliently bent towards each other as compared to the starting position of the second anti-entanglement stirrup 26, which is shown in FIG. 5. Due to the elastic resetting force of the stirrup legs 28, these press against the windings 38 in the inner space 40 of the second coil spring 36. This results in a frictional engagement between the stirrup legs 28 and the windings 38, which holds the second anti-entanglement stirrup 26 in the second coil spring 36. The insertion depth of the anti-entanglement stirrup 26 in the inner space 40 of the coil spring 36 is limited by abutment of the stirrup ends 32 at the lower end winding 42.

FIG. 5 shows the second anti-entanglement stirrup 26 of the second spring assembly 34 in a schematic perspective view, which in the following will be referred to as second anti-entanglement stirrup 26. In this relaxed initial state of anti-entanglement stirrup 26, the distance of the stirrup legs 28 from each other increases with increasing distance from the stirrup junction 30. Stirrup ends 32 protrude from the longitudinal extension direction of the stirrup legs 28 at a large angle, which in the present embodiment is about 90 degrees. The stirrup ends 32 are formed as flat areas in the present embodiment. In this embodiment, the material thickness of the stirrup junction 30, the stirrup legs 28 and stirrup ends 32 is approximately equal.

Figure 6:
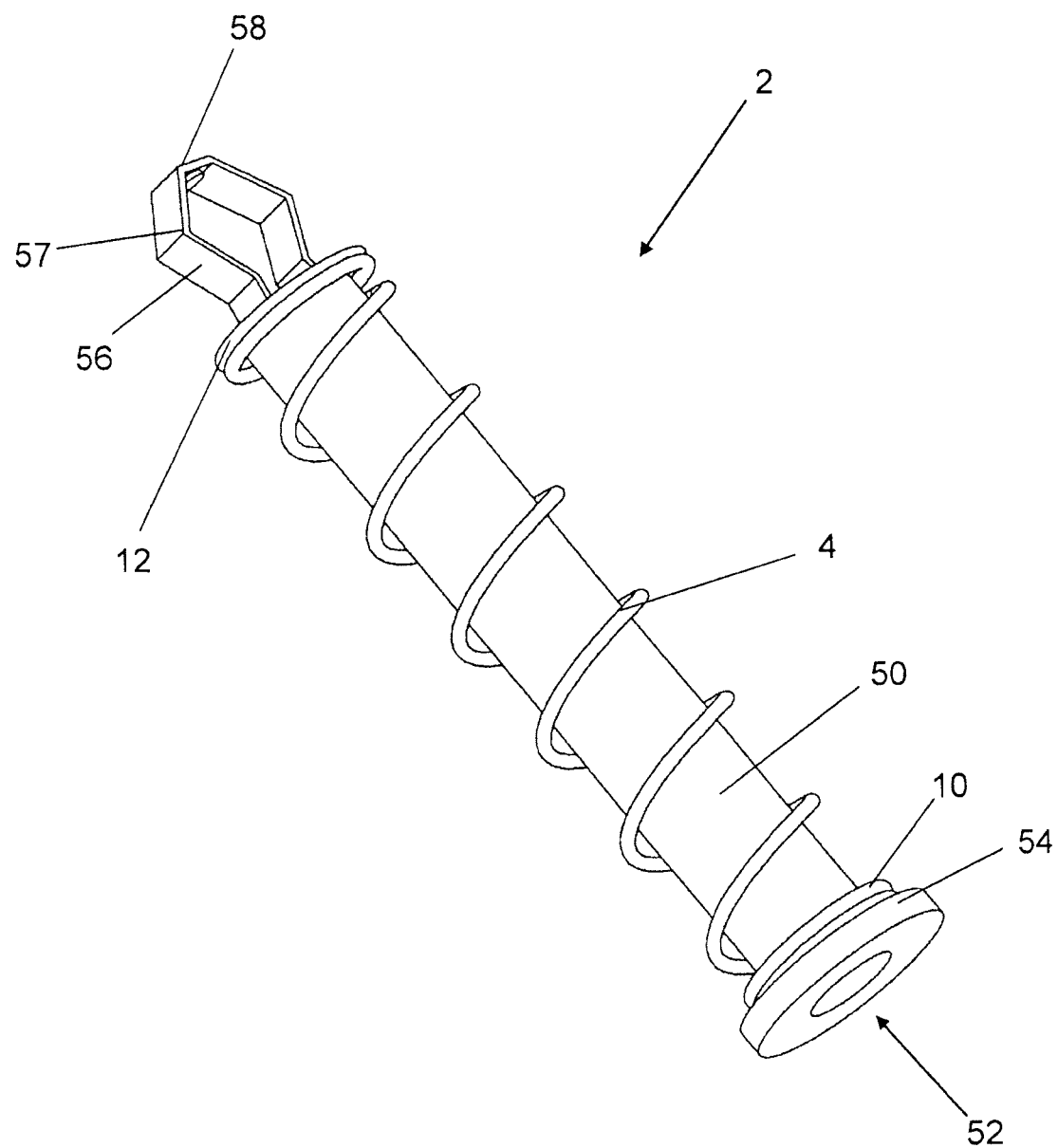
FIG. 6 illustrates a third spring assembly according to a third embodiment in a schematic perspective view.

FIG. 6 illustrates a third spring assembly 46 according to a third exemplary embodiment in a schematic perspective view.

The third spring assembly 46 comprises a coil spring 4, which in structure corresponds to the first coil spring 4 according to the first embodiment, which will not be described again in detail here.

Furthermore, the third spring assembly 46 comprises as anti-entanglement element an anti-entanglement pin 48 formed separately from the coil spring. The anti-entanglement pin 48 extends through the inner space 8 formed by the spring windings 6 along the coil spring 4. For this purpose, the anti-entanglement pin 48 has a pin body 50, the diameter of which is smaller than the inner diameter of the coil spring 4. The anti-entanglement pin 48 is made of plastics in this embodiment, but may also be made of other materials, e.g. metal. The pin body 50 has a longitudinal opening 52 extending in the axial direction through the pin body 50.

The anti-entanglement pin 48 has a rear stop end, which is formed as broadened insertion-depth limiting collar 54 which is integrally formed with the pin body 50 and the diameter of which is greater than the inner diameter of the coil spring 4. Upon insertion of the anti-entanglement pin 48 into the coil spring 4, the insertion-depth limiting collar 54 limits the axial insertion of the anti-entanglement pin 48 into the coil spring 4 by its diameter which is greater than the inner diameter of the coil spring 4. The anti-entanglement pin 48 comprises furthermore a loss-prevention or captive end which, in this embodiment, is in the form of two flexible loss-prevention arms 56 beginning at the front end of the pin body 50 and formed integrally therewith in the present embodiment. The loss-prevention arms 56 each have a radially outwardly curved bulge portion 57 and a front forceps end 58.

Upon activation of the front forceps end 58 of the loss-prevention arms 56 in axial forward direction, i.e. away from the insertion-depth limiting collar 54, by way of an actuating pin (not shown in FIG. 6, see FIGS. 7 and 8) inserted through the longitudinal opening of the pin body 50, the bulge portions 57 of the loss-prevention arms 56 can be stretched. This reduces the diameter of the bulge portions 57, i.e. decreases the maximum distance of the opposing bulge portions 57 from each other, from a larger diameter which is greater than the inner diameter of the coil spring 4 to a smaller diameter which is smaller than the inner diameter of the coil spring 4. By actuation by means of the actuating pin 60 through the longitudinal opening 52, the diameter of the loss-prevention or captive end of anti-entanglement pin 48 can thus be reduced such that the captive end can be passed through the inner space 8 of the coil spring 4. In the unactuated state, the loss-prevention arms 56 resiliently move apart, so that an anti-entanglement pin 48 introduced into the coil spring 4 is reliably and captively held on the coil spring 4 by means of the loss-prevention arms 56 and the insertion-depth limiting collar 54.

FIGS. 7A to 7E illustrate a method for introducing an anti-entanglement pin 48 into the inner space 8 of the first coil spring 4 for forming the third spring assembly 46, broken down into individual method steps.

The sequence of the method is illustrated in accordance with FIGS. 7A to 7E on the basis of five method steps.

Figure 7A:
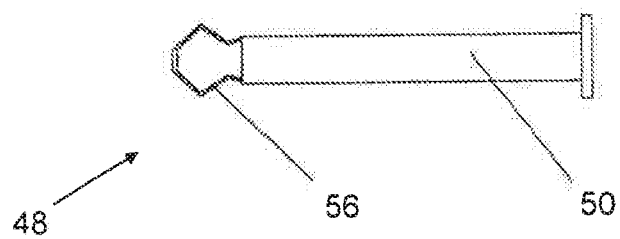
FIGS. 7A to 7E illustrate a method for introducing an anti-entanglement pin into an inner space of a coil spring for forming the third spring assembly, broken down into individual method steps.

FIG. 7A illustrates the method step of providing an anti-entanglement pin 48 which has been described in detail with reference to FIG. 6.

Figure 7B:
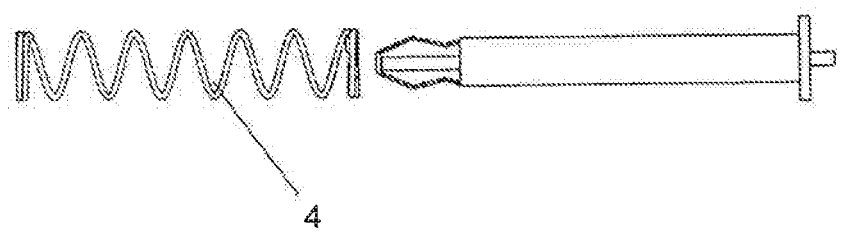

FIG. 7B illustrates the method step of actuating the front captive end with the loss-prevention arms 56 by inserting an actuating pin 60 through the longitudinal opening 52 of the pin body 50 such that the diameter of the front captive end with the loss-prevention arms 56 decreases such that it is smaller than the inner diameter of the coil spring. 4 By stretching the loss-prevention arms 56 in the axial direction by pushing a pin tip 62 of the actuating pin 60 against the loss-prevention arms 56, the bulge regions 57 are radially deflected inwardly, and the captive end is reduced in diameter in the region of the loss-prevention arms 56. As a result, the coil spring 4 can then be pushed over the captive end with the loss-prevention arms 56.

Figure 7C:
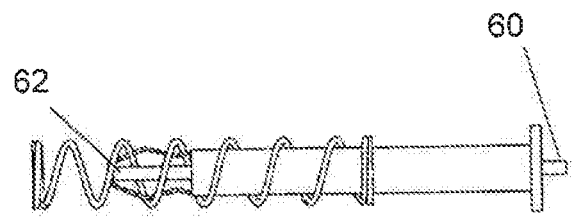

FIG. 7C illustrates the method step of inserting the anti-entanglement pin 48 into the inner space of the coil spring 4. In the present embodiment, this is effected to such an extent until the broadened insertion-depth limiting collar 54 abuts against the rearmost winding of the coil spring 4 and/or the front captive end with the loss-prevention arms 56 is arranged before the foremost winding of the coil spring 4. In this regard, the coil spring 4 may be axially biased or may be loosely applied to the anti-entanglement pin 48, in particular between its front loss-prevention or captive end and its rear stop end.

Figure 7D:
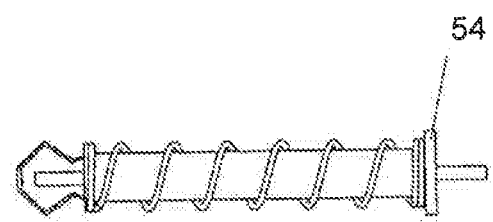

FIG. 7D illustrates the third spring assembly 46 in the method step after termination of the actuation of the front captive end, when the actuating pin 60 is pulled out of the longitudinal opening 52 of the pin body 50. By the axial withdrawal of the actuating pin 60 away from the forceps end 58 and thus the lack of axial stretching of the loss-prevention arms 56, the bulge portions 57 can resiliently return in radially outward direction. This increases the greatest distance of the bulge regions 57 from each other, so that they can no longer be axially displaced through the inner space 8 of the windings 6. Thus, the captive end with the loss-prevention arms 56 is axially fixed on one side with respect to the coil spring 4. Since the pin body 50 abuts with its insertion-depth limiting collar 54 on the other side of the coil spring 4, the coil spring 4 and the anti-entanglement pin 48 are axially fixed with respect to each other.

Figure 7E:
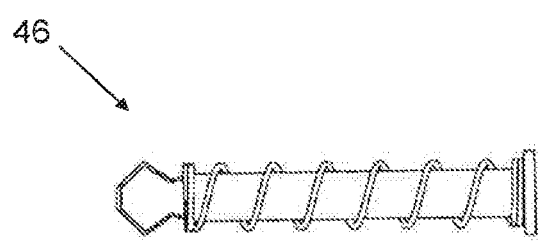

FIG. 7E illustrates the third spring assembly 46 in the final assembled state. Upon actuation of the forceps end 58 at the captive end, the actuating pin 60 was removed again from the spring assembly 46 by withdrawal from the longitudinal opening 52.

FIGS. 8A to 8E illustrate a method for removing the anti-entanglement pin 48 from the inner space of the first coil spring 4 in the third spring assembly 46 with simultaneous introduction of the coil spring 4 into its installation position, broken down into individual method steps. The removal of the anti-entanglement pin 48 takes place substantially in the reverse order of the introduction of the anti-entanglement pin 48 described with reference to FIGS. 7A-7E.

Figure 8A:
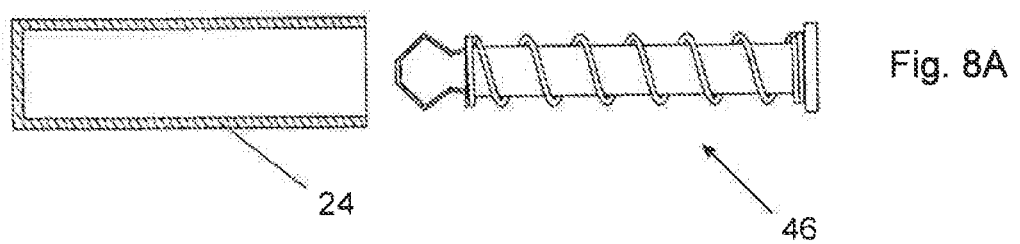
FIGS. 8A to 8E illustrate a method for removing the anti-entanglement pin from the inner space of the coil spring in the third spring assembly, broken down into individual method steps.

FIG. 8A shows the third spring assembly 46 in a method step of the mounted state.

Figure 8B:
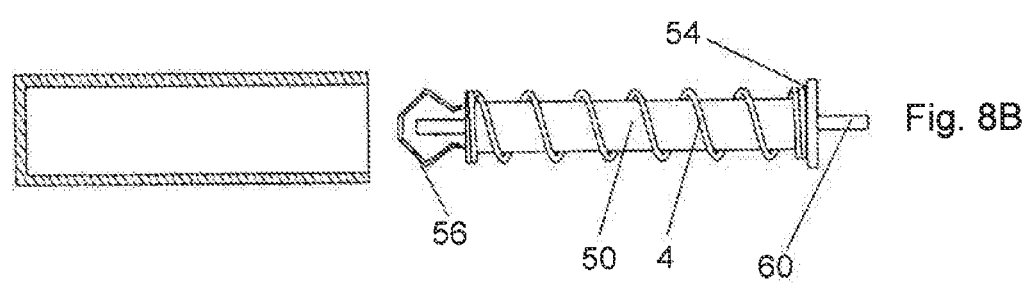

FIG. 8B shows the method step of actuating the front captive end with the loss-prevention arms 56 by inserting an actuating pin 60 through the longitudinal opening 52 of the pin body 50 such that the diameter of the front captive end, in particular in the region of the loss-prevention arms 56, is reduced such that it is smaller than the inner diameter of the coil spring 4.

Figure 8C:
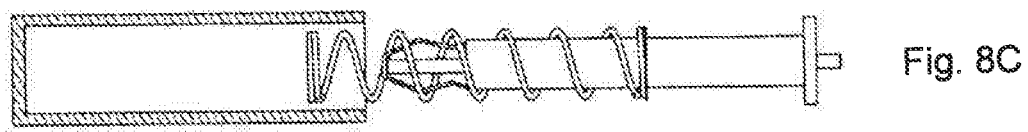

FIG. 8C shows the method step of withdrawing the anti-entanglement pin 48 from the inner space 8 of the coil spring 4.

Figure 8D:
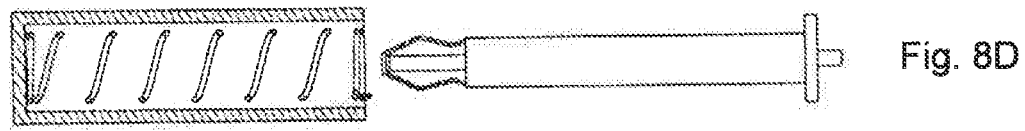

FIG. 8D shows the method step of depositing the coil spring 4 on a component 24.

Figure 8E:
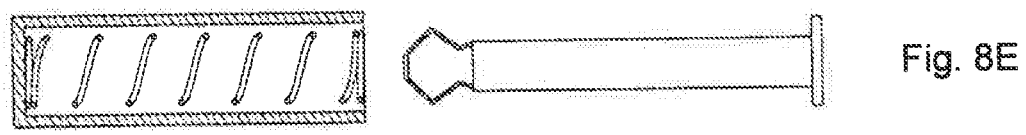

FIG. 8E shows the state at the end of the last method step, when the actuating pin 60 has been separated from the anti-entanglement pin 48, so that the loss-prevention arms 56 have elastically returned into their relaxed radially broadened initial position.

Figure 9A:
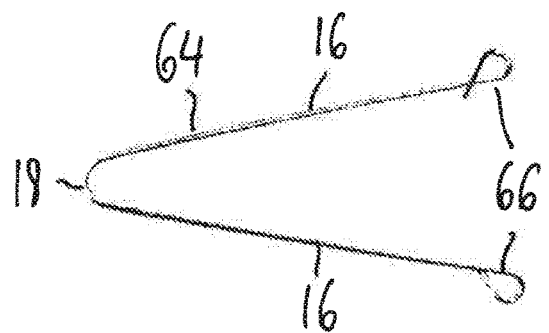
FIG. 9A illustrates a side view of a third anti-entanglement stirrup.
Figure 9B:
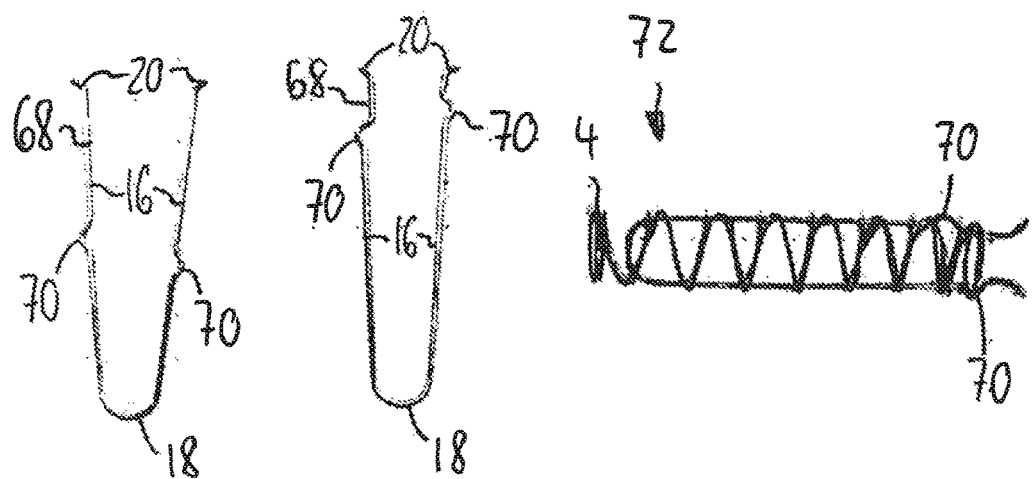
FIG. 9B illustrates side views of two fourth anti-entanglement stirrups and a side view of a fifth spring assembly in which a fourth anti-entanglement stirrup is clampingly supported in the inner space of the first coil spring.
Figure 9C:
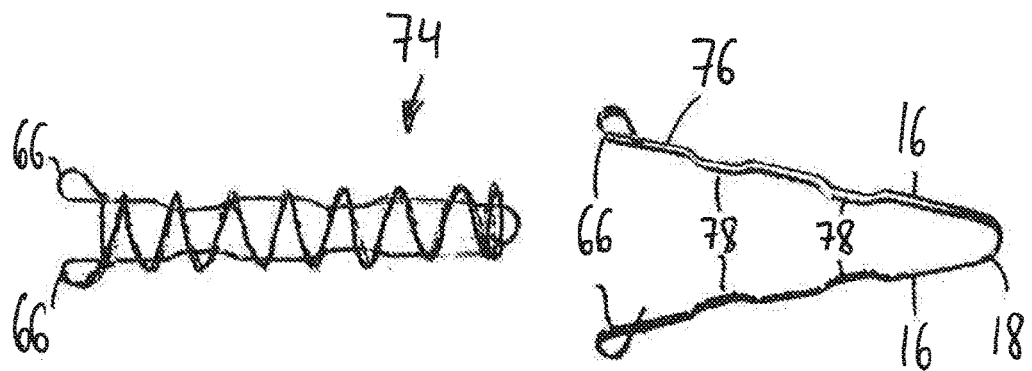
FIG. 9C illustrates a side view of a fifth anti-entanglement stirrup and a side view of a fifth spring assembly in which the fifth anti-entanglement stirrup is clampingly held in the inner space of the first coil spring.

FIGS. 9A-9C show a side view of a third anti-entanglement stirrup 64.

FIG. 9B shows side views of two fourth anti-entanglement stirrups 68 and a side view of a fifth spring assembly 72, in which a fourth anti-entanglement stirrup 68 is clampingly supported in the inner space of the first coil spring 4.

FIG. 9C shows a side view of a fifth anti-entanglement stirrup 76 and a side view of a fifth spring assembly 74, in which the fifth anti-entanglement stirrup 76 is clampingly supported in the inner space of the first coil spring 4.

Figure 10A:
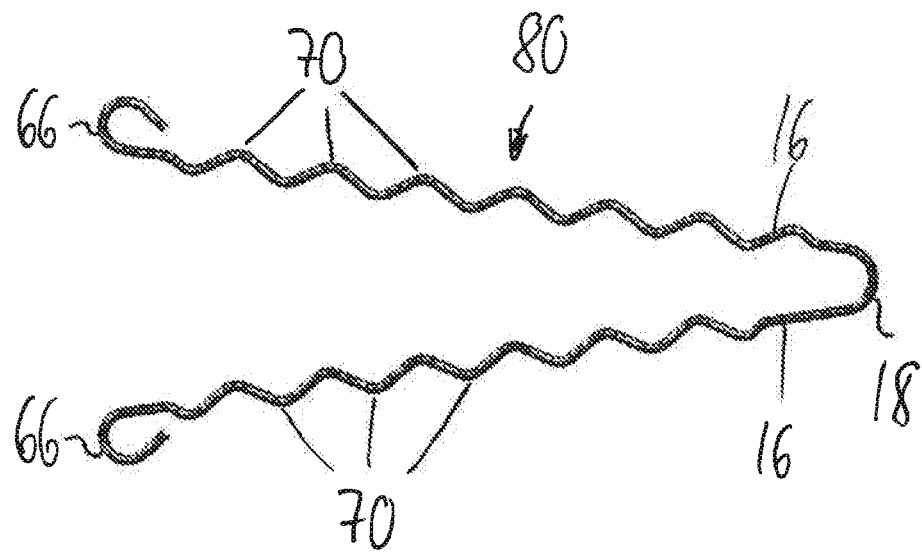
FIGS. 10A and 10B illustrate schematic side views of a sixth and seventh anti-entanglement stirrup.
Figure 10B:
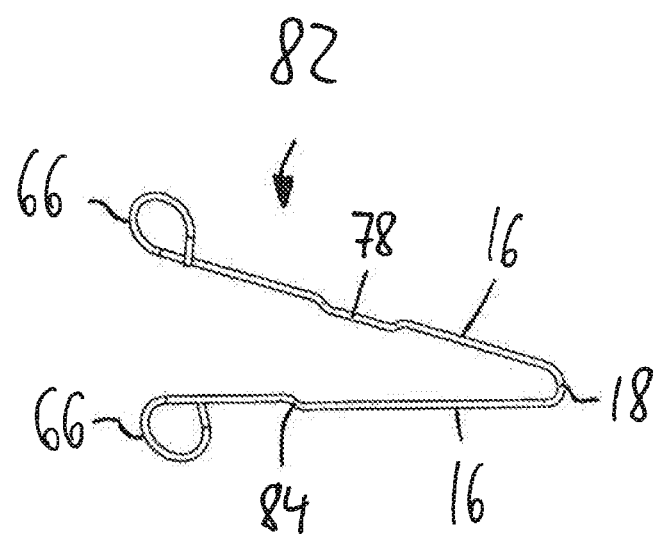

FIGS. 10A and 10B illustrate schematic side views of a sixth and seventh anti-entanglement stirrup 80, 82.

FIGS. 9A, 9B, 9C, 10A and 10B show modifications of the first anti-entanglement stirrup 14 from FIGS. 1, 2 and 3, in which the ends of the stirrup legs 16 (FIGS. 9A, 9C, 10A and 10B) are designed differently and in which the stirrup legs 16 are formed with noses 70 (FIGS. 9B and 10A), with beads 78 (FIGS. 9C and 10B) and with a step 84 (FIG. 10B).

The third anti-entanglement stirrup 64 from FIG. 9A corresponds to the first anti-entanglement stirrup 14 from FIGS. 1 to 3, with the stirrup ends being designed in the form of an eyelet, thus constituting eyelet ends 66. The ends are bent outwardly into an eyelet, forming an angle of at least 180°, so that the spring wire ends are not directed outwardly, but are directed roughly speaking in the direction of the stirrup junction 18. In FIG. 9A, the spring wire ends protrude slightly beyond the respective stirrup leg 16 and form a complete eyelet. The spring wire end and the respective stirrup leg 16 include an angle.

A similar end design with eyelet ends 66 is also present in the fifth anti-entanglement stirrup 76 according to FIG. 9C.

In case of the eyelet ends 66 of the sixth anti-entanglement stirrup 80 of FIG. 10A, the spring wire ends of the stirrup legs 16 are also bent outwardly such that they extend roughly in the direction of the stirrup junction 18. In this case, the spring wire ends are each spaced outwardly from the stirrup leg end portions. The eyelet ends thus formed can also be referred to as hook ends.

In the seventh anti-entanglement stirrup 82 of FIG. 10B, the spring wire ends of the stirrup legs 16 are completely bent outwardly, forming an angle of at least 270°. The spring wire ends thereof are located at the level of the stirrup leg end portions 16, while forming in particular a right angle.

It is prevented by such eyelet ends that the ends of the stirrup legs 16 themselves lead to entanglements with other spring assemblies, other anti-entanglement stirrups or other coil springs. Likewise, there is prevented damage to the packaging material, such as puncturing of transport bags, in which such anti-entanglement stirrups, coil springs and spring assemblies are transported. Finally, abrasion in the plastic bag is prevented, so that the formation of particles during transport is minimized.

FIG. 9B shows two variants of a fourth anti-entanglement stirrup 68. In both variants, both stirrup legs 16 each have a nose 70 which lies in the plane spanned by the stirrup legs 16 and the stirrup junction 18 and extends in each case a certain distance outwardly from the direction of extension of the two stirrup legs 16. In this case, the two noses 70 are arranged in offset manner in relation to the length of the stirrup legs 16, by approximately half of a winding pitch of the first coil spring 4.

In case of the first variant of the fourth anti-entanglement stirrup 68, the two noses 70 are arranged approximately in a middle portion of the stirrup legs 16, and in the second variant, the two noses 70 are arranged in a front portion near the stirrup ends 20 of the stirrup legs 16.

In case of the fourth spring assembly 72, in which the fourth anti-entanglement stirrup 68, second variant, has been introduced into the inner space of the first coil spring 4 from the right, as described with respect to FIG. 2, the two noses 70 are each arranged in the space between two adjacent spring windings of the first coil spring 4 and thus slightly project outwardly from the spring inner space. As a result, slipping of the fourth anti-entanglement stirrup 68 with respect to the first coil spring 4 is reliably avoided, and the fourth anti-entanglement stirrup 68 is thus placed in position even more accurately and in even more slip-proof manner with respect to the first coil spring 4.

In case of the fifth anti-entanglement stirrup 76, each of the two stirrup legs 16 is provided with two beads 78 which are located in a plane spanned by the stirrup legs 16 and the stirrup junction 18 and extend a certain distance inwardly from the extension direction of the stirrup legs 16. In the fifth spring assembly 74, the fifth anti-entanglement stirrup 76, as described in FIG. 2, has been introduced into the inner space of the first coil spring 4 from the left. As in case of the fourth anti-entanglement stirrup 68 with noses 70, more reliable and more slip-proof positioning of the anti-entanglement stirrup 76 in the inner space of the first coil spring 4 is achieved also in case of the fifth anti-entanglement stirrup 76 with beads 78. In addition, a positive engagement is achieved and the deformation of spring windings is to be prevented.

In case of the sixth anti-entanglement stirrup 80, both stirrup legs 16 are each formed with a multiplicity of noses 70. The noses 70 may lie in the plane which is spanned by the two stirrup legs 16 and the stirrup junction 18. Alternatively, the noses 70 may also lie in one or more other planes. The noses 70 extend outwardly with respect to the main direction of extension of the two stirrup legs 16. Between the respective adjacent noses 70, there may be provided valleys, as shown in FIG. 10a. The sixth anti-entanglement stirrup 80 is preferably inserted into the inner space of a coil spring such that the spring windings come to lie in the valleys each and the noses 70 extend into the spaces between each two adjacent spring windings and thus project somewhat outwardly from the spring inner space.

The sixth anti-entanglement stirrup 80 achieves particularly reliable and non-slip positioning of the anti-entanglement stirrup 80 relative to the respective coil spring and thus a particularly reliable spring assembly.

In addition, the sixth anti-entanglement stirrup 80 and the spring assembly formed therewith are also advantageously designed with respect to the withdrawal force.

The seventh anti-entanglement stirrup 82 of FIG. 10B has a bead 78 on its first stirrup leg 16. On its second stirrup leg 16, it is formed with a step 84. Such a seventh anti-entanglement stirrup 82 constitutes a very good trade-off between the simplicity of the stirrup and the function as well as the withdrawal force.

With regard to the further advantages, the assembly and disassembly of the anti-entanglement stirrups 64, 68, 76, 80 and 82, as shown in FIGS. 9A, 9B and 9C and 10A and 10B, reference is made to the statements made in relation to FIGS. 1, 2 and 3. These statements are not given again in order to avoid repetitions.

While the invention has been described with reference to exemplary embodiments and applications scenarios, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims and can be applied to various application in the industrial as well as commercial field.

What is claimed is:
1. A method for removing an anti-entanglement stirrup from an inner space of a coil spring in a spring assembly of a plurality of spring assemblies for a container, the method comprising:
  providing the container comprising the plurality of spring assemblies arranged therein as bulk material without entanglement, each spring assembly of the plurality of spring assemblies comprising:
    the coil spring having the inner space formed by spring windings of the coil spring; and
    an anti-entanglement element for protection against entanglement of the spring assembly with at least one further spring assembly or with at least one other coil spring;
  wherein the anti-entanglement element is reusable and partially disposed in the inner space formed by the spring windings and extends longitudinally through at least a portion of the inner space, and prevents entering of spring windings of adjacent coil springs into the inner space, and the spring windings of adjacent coil springs abut the anti-entanglement element in order to avoid that the spring windings of adjacent coil springs get into engagement with each other; and
  wherein:
    the anti-entanglement element is an anti-entanglement stirrup, formed separately from the coil spring and clampingly supported in the inner space,
    the anti-entanglement stirrup has at least two stirrup legs that abut a plurality of inner sides of the spring windings,
    an outwardly directed clamping force of the at least two stirrup legs acts on the plurality of inner sides of the spring windings, and
    in a non-compressed state of the anti-entanglement stirrup, the at least two stirrup legs are angled outwardly from one another along a length of the anti-entanglement stirrup from a first stirrup end to a second stirrup end;
  compressing the first stirrup end and the second stirrup end in a radial direction with a compressive force acting on the first stirrup end and the second stirrup end in the radial direction to such an extent that a stirrup distance between respective portions of the at least two stirrup legs adjoining the outwardly directed first stirrup end and second stirrup end is smaller than the inner diameter of the coil spring;
  removing the anti-entanglement stirrup from the inner space of the coil spring; and
  terminating the compression of the stirrup ends;
  wherein the step of removing the anti-entanglement stirrup from the inner space of the coil spring includes removing the anti-entanglement stirrup from the inner space of the coil spring by dropping the coil spring due to its gravity.

2. The method according to claim 1:
wherein the anti-entanglement stirrup of a respective spring assembly comprises at least two stirrup legs and a stirrup junction which integrally connects the at least two stirrup legs; and/or
wherein at least one of the stirrup legs of the anti-entanglement stirrup is provided with at least one nose, with at least one bead, and/or with at least one step; or
wherein the first stirrup end and the second stirrup end of the anti-entanglement stirrup comprises outwardly directed stirrup ends with respect to an axis of symmetry of the anti-entanglement stirrup; or
wherein the first stirrup end and the second stirrup end of the anti-entanglement stirrup comprises eyelet-shaped stirrup ends.

3. The method according to claim 2:
wherein the anti-entanglement stirrup of the respective spring assembly is clampingly supported in the inner space of the coil spring formed by the spring windings such:
that the axis of symmetry of the coil spring and the axis of symmetry constitute a common axis; or
that the first stirrup ends and the second stirrup end, with respect to the axis of symmetry of the coil spring, protrude at an axial end of the coil spring in radial outward direction.

4. The method according to claim 2:
wherein the anti-entanglement stirrup of the respective spring assembly comprises two stirrup legs with a respective stirrup end and a stirrup junction integrally connecting the two stirrup legs.

5. The method according to claim 2:
wherein the anti-entanglement stirrup of a respective spring assembly has three stirrup legs with a respective stirrup end and a stirrup junction which integrally connects the three stirrup legs to each other, said stirrup legs being staggered at an angle to each other in the circumferential direction.

6. The method according to claim 2:
wherein the anti-entanglement stirrup of a respective spring assembly extends so far into the inner space of the coil spring formed by the spring windings that the outwardly projecting stirrup ends abut the first winding of the coil spring, or
that the stirrup junction is arranged radially inside the last winding or one of the last windings of the coil spring.

7. A method for introducing an anti-entanglement plastic pin into an inner space of a coil spring to form a spring assembly of a plurality of spring assemblies for a container, the method comprising:
  providing the coil spring having the inner space formed by spring windings of the coil spring;
  providing the anti-entanglement plastic pin as an anti-entanglement element configured for protection against entanglement of the spring assembly with at least one further spring assembly or with at least one other coil spring, the anti-entanglement plastic pin formed separately from the coil spring and including a front captive end, a rear stop end, and a pin body having a longitudinal opening extending axially through the pin body, the rear stop end designed as a broadened insertion-depth limiting collar formed integrally with the pin body and having a rear stop end diameter which is greater than an inner diameter of the coil spring, the pin body having a pin body diameter which is smaller than the inner diameter of the coil spring;
  actuating the front captive end by inserting an actuating pin through the longitudinal opening of the pin body such that a front captive end diameter of the front captive end decreases such that the front captive end diameter is smaller than the inner diameter of the coil spring;
  inserting the anti-entanglement plastic pin into the inner space of the coil spring or dropping the coil spring onto the anti-entanglement plastic pin;
    wherein the anti-entanglement plastic pin is reusable and partially disposed in the inner space formed by the spring windings and extends longitudinally through at least a portion of the inner space, and prevents entering of spring windings of adjacent coil springs into the inner space, and the spring windings of adjacent coil springs abut the anti-entanglement plastic pin in order to avoid that the spring windings of adjacent coil springs get into engagement with each other; and terminating the actuation of the front captive end by pulling the actuating pin out of the longitudinal opening of the pin body such that the container comprises the plurality of spring assemblies arranged therein without entanglement.

8. The method according to claim 7:
wherein the front captive end comprises at least two loss-prevention arms which are arranged beginning at the front end of the pin body; and
wherein the at least two loss-prevention arms each have at least one radially outwardly curved bulge portion and a front forceps end; or
wherein the at least two loss-prevention arms are designed to be bendable.

9. The method of claim 8, wherein the at least two loss-prevention arms are designed to be bendable such that, in case of an axially forwardly directed actuation of the front forceps ends of the loss-prevention arms by way of an actuating pin introduced through the longitudinal opening of the pin body, the bulge portions of the loss-prevention arms are stretched, thereby reducing a bulge diameter of the bulge portions;
wherein, in doing so, the bulge diameter of the bulge portions decreases from a larger diameter which is greater than the inner diameter of the coil spring to a smaller diameter which is smaller than the inner diameter of the coil spring.

10. A method for removing the anti-entanglement plastic pin from the inner space of the coil spring in the spring assembly of the plurality of spring assemblies for the container, the container comprising the plurality of spring assemblies arranged therein without entanglement according to claim 7, the method comprising:

actuating the front captive end by inserting the actuating pin through the longitudinal opening of the pin body such that the front captive end diameter of the front captive end decreases such that the front captive end diameter is smaller than the inner diameter of the coil spring; and withdrawing the anti-entanglement plastic pin from the inner space of the coil spring.

11. The method of claim 7, wherein the pin body is tubular.

12. The method of claim 7, wherein the step of inserting the anti-entanglement plastic pin into the inner space of the coil spring or dropping the coil spring onto the anti-entanglement plastic pin includes inserting the anti-entanglement plastic pin into the inner space of the coil spring or dropping the coil spring onto the anti-entanglement plastic pin so far that the broadened insertion-depth limiting collar abuts the rearmost winding of the coil spring and/or the front captive end is arranged in front of a foremost winding of the coil spring.

* * * * *